United States Patent [19]
Matulaitis

[11] 3,969,602
[45] July 13, 1976

[54] STRUCTURE FOR AND METHOD OF ELECTROEROSION MACHINING

[75] Inventor: Victor E. Matulaitis, Franklin, Mich.

[73] Assignee: Ex-Cell-O Corporation, Detroit, Mich.

[22] Filed: Apr. 1, 1969

[21] Appl. No.: 811,719

[52] U.S. Cl. .............................. 219/69 C; 219/69 M
[51] Int. Cl.² .......................................... B23P 1/08
[58] Field of Search .............. 219/69 C, 69 G, 69 P, 219/69 S, 69 F

[56] References Cited
UNITED STATES PATENTS

| | | | |
|---|---|---|---|
| 2,769,078 | 10/1956 | Matulaitis | 219/69 S |
| 2,951,969 | 9/1960 | Matulaitis et al. | 219/69 C X |
| 3,020,448 | 2/1962 | Fefer | 219/69 P X |
| 3,277,338 | 10/1966 | Webb | 219/69 P X |
| 3,513,837 | 5/1970 | Sennowitz | 219/69 P |

Primary Examiner—Bruce A. Reynolds
Attorney, Agent, or Firm—Whittemore, Hulbert & Belknap

[57] ABSTRACT

Electroerosion machining is accomplished by making and breaking a series circuit between a direct current power supply, an electrode and a workpiece as quickly as possible with a minimum loss of energy at a predetermined but variable frequency in accordance with the invention. The condition of the machining gap between the electrode and workpiece is monitored during each machining cycle and the making of the series circuit is inhibited on sensing a voltage between the electrode and workpiece below a predetermined minimum voltage at the time of breaking of the circuit in the previous machining cycle. Subsequently, the voltage across the machining gap is monitored at intervals increasing in time to a maximum interval, and the continued making and breaking of the series circuit is permitted only after the voltage between the electrode and workpiece is found to be a proper machining voltage.

5 Claims, 7 Drawing Figures

INVENTOR.
VICTOR E. MATULAITIS
BY Whittemore,
Hulbert & Belknap
ATTORNEYS

STRUCTURE FOR AND METHOD OF ELECTROEROSION MACHINING

BACKGROUND OF THE INVENTION

1. Field of the Invention

The invention relates to electrical discharge machining and refers more specifically to a circuit for and method of electrical discharge machining including means for rapidly switching electric current between a workpiece and electrode on and off at different selected frequencies with a minimum amount of energy dissipation, means for monitoring the voltage between the electrode and workpiece and preventing switching on of the current between the electrode and workpiece only if a short is indicated between the electrode and workpiece at the end of a machining cycle, and means for providing a trial machining cycle periodically at progressively larger intervals up to a maximum interval and resuming normal machining cycles only in response to the voltage between the electrode and workpiece reaching a proper machining magnitude.

2. Description of the Prior Art

In the past electrical discharge machining apparatus has included resistance-capacitance circuits, direct current circuits pulsed by mechanical circuit breakers and the like and some pulsed semiconductor circuits for periodically providing a spark or arc discharge between an electrode and workpiece to effect electrical machining in the presence of diaelectric fluid or coolant.

In addition, in prior electrical discharge machining circuits a short between the electrode and workpiece has often been permitted to cause damage to the workpiece before being extinguished. Where direct current arcing protection circuits have been provided in the past, they have been inefficient in that they do not distinguish between direct current arcing which clears itself within the space of a normal cutting arc or spark and those which persist after the normal cutting cycle has been completed.

SUMMARY OF THE INVENTION

In accordance with the present invention an electrical circuit is provided for use in the usual electrical discharge machining situation in conjunction with the usual machine tool and servo feed mechanism and in the presence of a dielectric fluid between an electrode and workpiece. The circuit of the invention provides rapid on and off switching of a direct current between an electrode and workpiece with a minimum dissipation of electrical energy. The basic circuit makes use of a first silicon controlled rectifier in series with the electrode and workpiece and a direct current power supply. A second silicon controlled rectifier is positioned in parallel with the first silicon controlled rectifier and is separated therefrom by a capacitor. The capacitor is in series resonance at alternate times with one of the silicon controlled rectifiers and an inductance in series with the other silicon controlled rectifier and a unidirectional device.

The silicon controlled rectifiers are alternately driven on and off by a drive circuit under the control of a control circuit. The drive circuit includes a multivibrator directly connected on one side to the second silicon controlled rectifier, and connected on the other side indirectly to the first silicon controlled rectifier. The indirect connection of the first silicon controlled rectifier to the multivibrator in connected to the control circuit which includes means for sensing a minimum voltage across the electrode and workpiece and preventing switching of the first silicon controlled rectifier to an on condition in response to the voltage between the electrode and workpiece being below a predetermined minimum, and means for periodically providing a monitoring or trial pulse through the first silicon controlled rectifier at progressively larger intervals to determine if the short between the electrode and workpiece has been cleared and for restarting of the machining cycle if the short has cleared.

Thus, in accordance with the method of the invention, the electrical energy from a direct current source of electrical energy is passed through a series circuit including an electrode and a workpiece and switching means for making and breaking the electric circuit with a minimum of energy dissipation and as rapidly as possible at a selected frequency as long as at least a minimum voltage is present between the electrode and workpiece. The method of the invention further includes preventing making of the series circuit through the electrode and workpiece if a short circuit exists therebetween at the end of a machining cycle and monitoring the machining gap at progressively larger intervals up to a maximum interval to determine when the short is cleared and automatically restarting the making and breaking of the series circuit on sensing a voltage above a minimum voltage between the electrode and workpiece.

BRIEF DESCRIPTION OF THE DRAWINGS

FIGS. 2—A through 2—C are graphic representations of operating parameters of the electrical discharge machining circuit illustrated in FIG. 1.

DESCRIPTION OF THE PREFERRED EMBODIMENT

Figure 1:
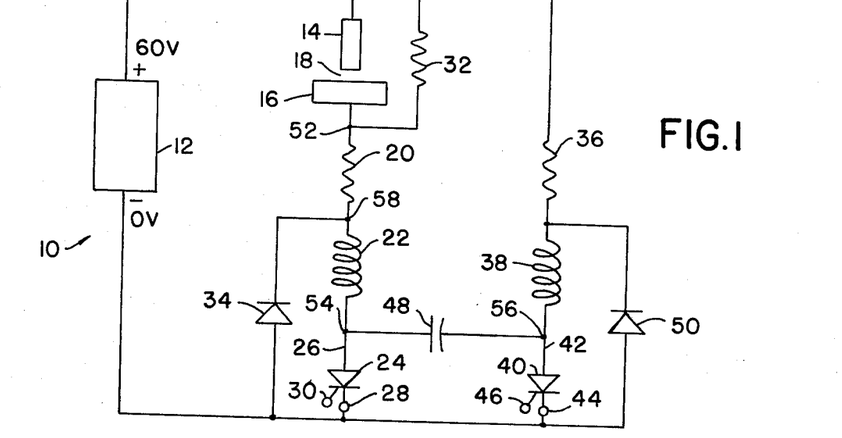
FIG. 1 is a schematic diagram of an electrical discharge machining circuit constructed in accordance with the invention.

The basic electrical discharge machining circuit 10 of the invention is a semi-conductor inverter circuit. As shown in FIG. 1, the electrical discharge machining circuit 10 includes a source of direct current electrical power 12 which may be of any convenient type such as a conventional transformer rectifier assembly, a motor generator set or a battery source. The power source 12 may be from sixty to one hundred volts in a normal machining operation.

An electrode or tool 14 and workpiece 16 are connected to opposite sides of the power supply in the usual electrical discharge machining circuit to provide a spark or arc machining gap 18 in series with a resistance 20, inductor 22 and silicon controlled rectifier 24. Rectifier 24 includes an anode 26, cathode 28 and control electrode 30.

A resistor 32 is connected in parallel with the electrode 14 and workpiece 16 across the machining gap 18, as illustrated. Diode 34 is connected in parallel with the inductor 22 and silicon controlled rectifier 24, as shown in FIG. 1.

A resistor 36, inductor 38 and silicon controlled rectifier 40 having anode 42, cathode 44 and control electrode 46 are connected in series across the power supply 12 and in parallel with the electrode 14, spark gap 18, workpiece 16, resistor 20, inductor 22 and silicon controlled rectifier 24. Capacitor 48 is connected between the anode electrodes of the silicon controlled rectifiers 24 and 40, and a diode 50 is connected across the series combination of inductor 38 and silicon controlled rectifier 40, as shown.

Before the operation of the basic electrical discharge machine circuit 10 of FIG. 1 is considered, it will be understood that the operation of the circuit 10 is intended to be in conjunction with the usual electrical discharge machining structure, such as a servo feed circuit and mechanism, dielectric or coolant supply apparatus, dielectric fluid and a machine tool on which the electrode 14 and workpiece 16 are supported for movement toward and away from each other and through which the dielectric fluid is circulated in the machining gap 18. Such electrical discharge machining structure is well known and will not be considered in detail herein. In this regard, reference is made to U.S. Pat. No. 2,902,586 and the patents cited therein.

Figure 2A:
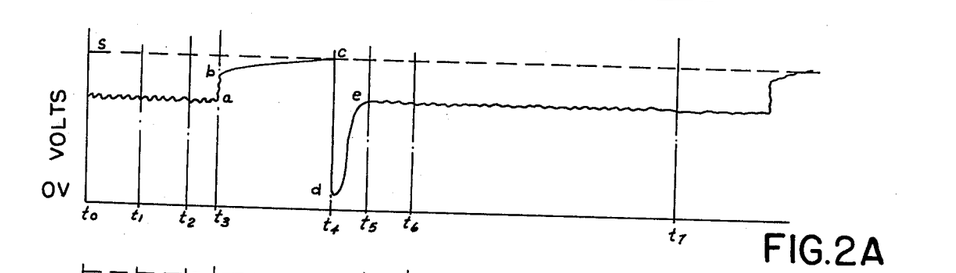
Figure 2B:
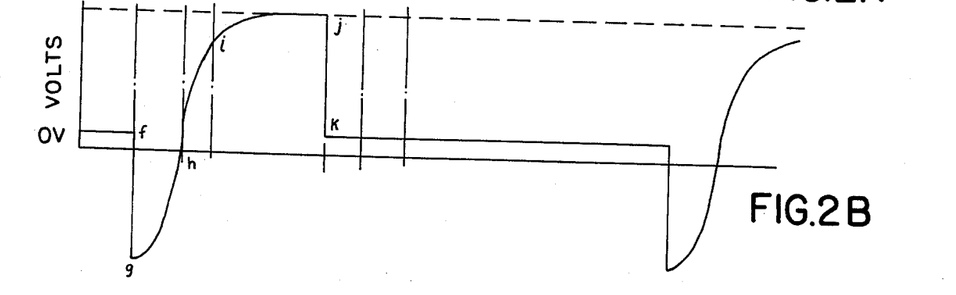
Figure 2C:
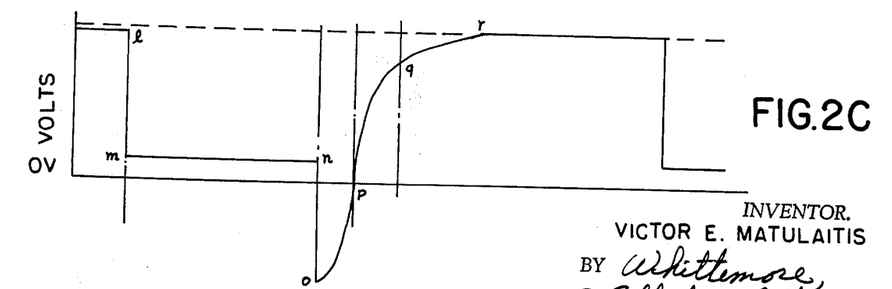

In considering the operation of the electrical discharge machine circuit 10, reference is made of FIGS. 2—A, 2—B and 2—C which illustrate typical voltage patterns at points 52, 54 and 56 respectively, in the circuit of FIG. 1. The horizontal extension of the graphs of FIGS. 2—A, 2—B and 2—C represent a time base with time at various points therealong being indicated $t_0$, $t_1$, $t_2$, $t_3$, $t_4$, $t_5$, $t_6$, and $t_7$. The vertical extent of the graphs of FIG. 2—A, 2—B and 2—C represent voltage with the time base line representing zero volts.

As is well known silicon controlled rectifiers 24 and 40 of FIG. 1 may be turned on to conduct current by application of suitable signals to the control electrodes 30 and 46. The specific driving circuit 60 for providing suitable signals to the control electrodes 30 and 46 will subsequently be considered in conjunction with FIG. 3.

It will arbitrarily be assumed that at time $t_0$ in the operation of the electrical discharge machine circuit 10 of FIG. 1 that rectifier 24 is conducting, and further that the machining gap between electrode 14 and workpiece 16 is conducting current in substantially a steady state condition in which current flows from the power supply 12 through the electrode 14, machining gap 18, workpiece 16, resistor 20, inductor 22 and rectifier 24 back to the power supply 12. If the power supply 12 is assumed to be within the range of sixty to one hundred volts, as previously indicated, which is normal for such power supplies, and the electrode is graphite or carbon with the workpiece being steel, the voltage drop across the machine gap will be approximately 22 to 24 volts. The voltage of point 52 will then be at the level designated $a$ in FIG. 2—A which is somewhat lower than the total potential of the power supply 12 as indicated $s$ in FIGS. 2—A, 2—B and 2—C.

Because the rectifier 24 is assumed to be conducting heavily, the voltage at point 54 will be only slightly higher than that of the negative side of the power supply which is zero volts, as shown in FIG. 2—B. This voltage between times $t_0$ and $t_1$ is indicated as $f$ in FIG. 2—B. At this initial time rectifier 40 is not conducting so that the voltage at point 58 will approach the voltage of the positive side of the power supply, as indicated at $l$ in FIG. 2—C between the times $t_0$ to $t_1$.

At time $t_1$ a control signal is applied to the control electrode 46 of rectifier 40 to cause rectifier 40 to conduct so that the voltage at point 56 will make the excursion $l$ to $m$ in FIG. 2—C. The voltage at point 56 will then remain slightly above the zero potential as indicated by $m$ and $n$ in FIG. 2—C between the time $t_1$ and $t_4$.

When the silicon controlled rectifier 40 conducts rectifier 24 is forced into a non-conducting state through the process known as commutation. Thus, just prior to time $t_1$ a substantial voltage difference exists across capacitor 48 since the point 56 is at the potential $l$ in FIG. 2—C while the point 54 is at the lower potential $f$ in FIG. 2—B. The voltage across a capacitor cannot change until there has been a charge redistribution or current flow. Therefore, as the potential at point 56 makes the excursion from $l$ to $m$ in FIG. 2—C, the voltage at point 54 is forced to make the excursion from $f$ to $q$ in FIG. 2—B. As the voltage at point 54 becomes negative, the voltage across the silicon controlled rectifier 24 is reversed and the rectifier becomes non-conductive.

Also, as the voltage at point 54 is forced to the level shown at $g$ in FIG. 2—B, the voltage which exists at point 58 will also tend to be depressed. As the voltage at point 58 tends to fall below that of the negative side of the power supply 12, diode 34 becomes conductive and clamps the voltage at point 58 to the negative side of the power supply which may be zero voltage.

At this instant in time there will be a substantial voltage difference existing across the inductor 22 since point 58 is held at substantially zero potential while point 54 is at the voltage level $g$ in FIG. 2—B. In response to this voltage difference, current through inductor 22 is sustained after cut off of rectifier 24. In fact, the inductor 22 and capacitor 48 constitute at this time a charged series resonant circuit with the current path from point 58 through inductor 22 to point 54 through capacitor 48 to point 56 through the silicon controlled rectifier 40 and back through diode 34 to point 58.

As is well known, the current and voltage wave forms in such oscillatory circuits are substantially sinusoidal in nature. Accordingly, the voltage at point 54 describes substantially the path $g$, $h$, $i$ in FIG. 2—B.

During the time interval $t_1$ to $t_2$ as the voltage at point 58 makes the excursion from $g$ to $h$, the current through inductor 22 increases to a maximum. At time $t_2$ although there is no longer any appreciable voltage difference between points 58 and 54, the current flowing in inductor 22 represents a substantial amount of stored energy in the magnetic field associated with the inductor. Therefore, the current which flows through inductor 22 at time $t_2$ tends to continue flowing through the aforementioned current path. This continuation of current flow through condenser 48 tends to elevate the voltage of point 54 along a path $h$, $i$ in FIG. 2—B during the time interval $t_2$ to $t_3$. During this time interval inductor 22 acts as an electric generator and there is a conversion from stored energy in the magnetic field associated with the inductor to electric field energy associated with the condenser 48.

At the time $t_3$ the energy conversion has been completed. At this time in an ordinary resonant circuit the oscillation would continue by a reversal of the aforementioned process. That is, with a reversal in current flow from condenser 48 through inductor 22. This reversal however is prevented in the electrical discharge machine circuit 10 by the presence of diode 34. Immediately on condenser 48 attempting to discharge back through inductor 22, diode 34 blocks the current flow and the voltage of point 58 rises rapidly to equal the voltage which exists at point 54 at that time. This oscillatory action will hereinafter be referred to as the swing cycle of rectifier 24. Subsequently the voltage at point 54 will rise substantially to the voltage of the positive side of the power supply during time $t_3$ to $t_4$ due to conduction through resistor 32 along the path $i$ to $j$ in FIG. 2—B.

Rectifier 40 has a swing cycle similar to that of rectifier 24. Thus, at some chosen time in a machine cycle after time $t_3$, such as at $t_4$ in FIGS. 2—A, 2—B and 2—C, the silicon controlled rectifier 24 is again rendered conductive by the application of a suitable control signal to control electrode 30 of rectifier 24. Conduction of rectifier 24 causes the voltage at point 54 to drop abruptly along the path $j$ to $k$ in FIG. 2—B. The voltage at point 56 is therefore caused to make the excursion $n$ to $o$, as shown in FIG. 2—C. Then, due to commutation, the voltage at point 56 makes the excursion $o, p, g$, due to the resonant circuit including inductor 38, capacitor 48, rectifier 24 and diode 50, as previously described. The conduction of rectifier 40 is stopped and the voltage at point 56 rises from 8 to r since point 56 is connected to power supply 12 through resistor 36.

It is not imperative to have a swing cycle circuit associated with the silicon controlled rectifier 40, as shown in the preferred embodiment of the electrical discharge machine circuit 10 but it is desirable. The swing circuit associated with the silicon controlled rectifier 40 is desirable in that it substantially reduces energy losses associated with commutation of the silicon controlled rectifier 40. Also, the second swing cycle circuit substantially reduces the length of time required to adequately charge condenser 48, and thus permits operation of the machining circuit 10 at a higher frequency than would otherwise be possible.

As illustrated in FIG. 2—A, with the rectifier 24 conducting at time $t_0$ the voltage across the machining gap 18 is maintained at a voltage $a$ below the voltage $s$ at the positive side of the power source. Although the silicon controlled rectifier 24 is switched to its nonconductive state at time $t_1$, current flow through the gap 18 continues without substantial change because point 58 is clamped in voltage to the voltage of the negative side of the power source or substantially zero volts as previously indicated at this time and since there was very little voltage drop across the rectifier 24 when it was conducting or across the inductor 22 during steady state current therethrough. Accordingly, machine gap current continues to flow during the time interval $t_1$ to $t_2$ substantially at the level $a$, as illustrated in FIG. 2—A.

The machine gap current also continues to flow during the time interval $t_2$ to $t_3$ during the completion of the swing cycle of the rectifier 24 since point 58 is clamped to the voltage at the negative side of the power source 12. At time $t_3$, when the inductor 22 ceases to function as a generator because the magnetic field energy is depleted, the voltage at point 58 rises rapidly to the voltage at point 54. The accompanying reduction in voltage across the machine gap 18 causes the existing current flow between the electrode 14 and workpiece 16 to extinguish abruptly, as illustrated in FIG. 2—A, with the voltage excursion from $a$ to $b$.

At point b in FIG. 2—A there is indicated a small voltage difference between the electrode 14 and the workpiece 16. This voltage difference, which is too small to sustain or initiate an arc or spark between the electrode 14 and work piece 16 exists since with the cessation of gap current the voltage at point 52 becomes equal to the voltage at point 54 and the voltage at point 54 does not quite equal the voltage $s$ at the positive side of the power source 12. This small voltage difference disappears rapidly as condenser 48 is charged by current flow through the resistor 32, resistor 20 and inductor 22. Accordingly, as illustrated in FIG. 2—A, no current flows through the machine gap and the gap is quiescent after time $t_3$.

Subsequently, when rectifier 24 is rendered conductive at time $t_4$, the voltage at point 52 dips sharply on the path $c$ to $d$ in FIG. 2—A, at which point ionization or breakdown of the machining gap 18 occurs. Once ionization occurs the voltage at the machine gap 18 follows the path $d$ to $e$ and drops to a voltage level characteristic of the materials associated with the machine gap 18 in a matter of a few microseconds. The arc or spark across the machine gap 18 is then allowed to persist for some preselected and preferred time, such as the time $t_5$ to $t_7$. At the preselected time $t_7$, rectifier 40 is again rendered conductive and the cycle of the electrical discharge machine circuit 10 is repeated as from time $t_1$.

Figure 3:
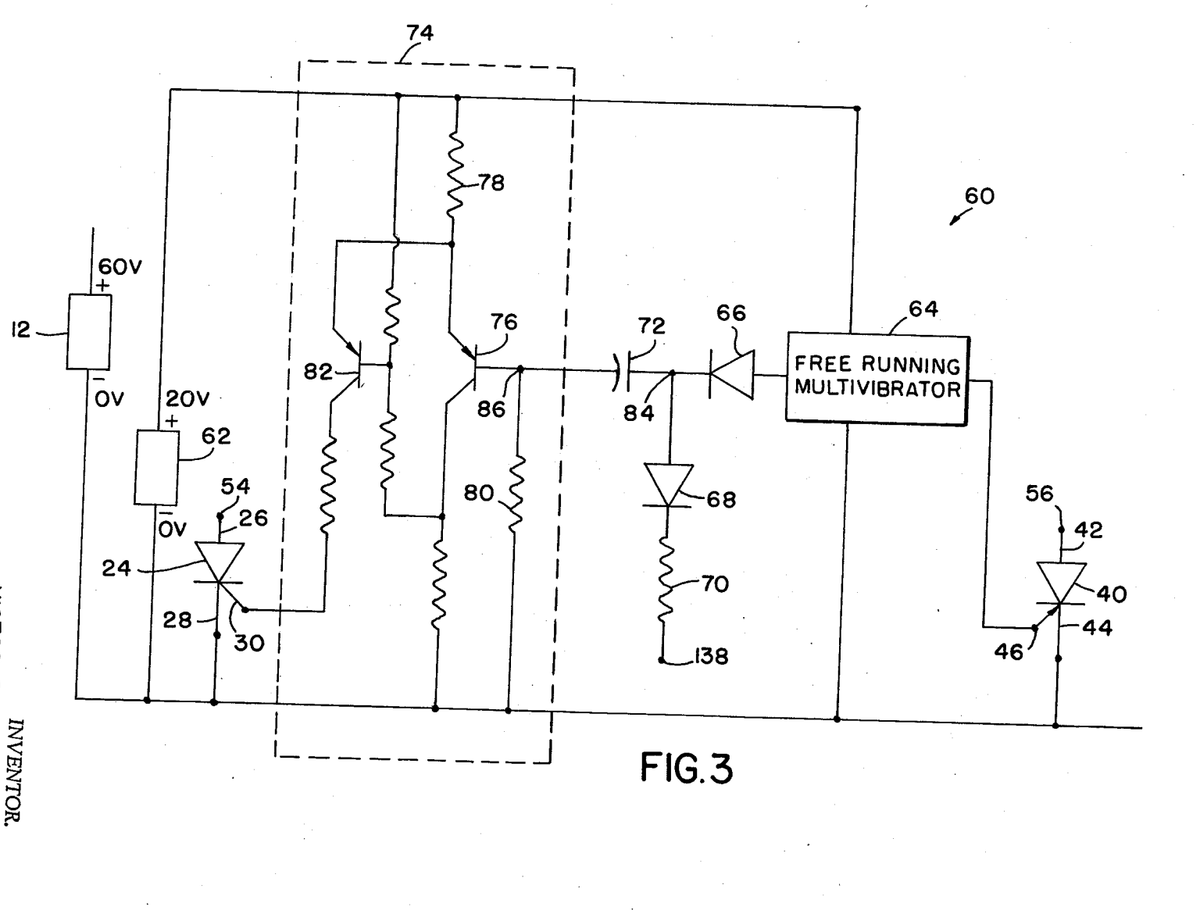
FIG. 3 is a schematic diagram of circuit means for driving the electrical discharge machining circuit illustrated in FIG. 1 constructed in accordance with the invention.

One drive circuit 60 for the electrical discharge machining circuit 10 is illustrated in FIG. 3. It will be understood that other drive circuits may be used with the circuit 10 to provide control signals at the control electrodes 30 and 46 of rectifiers 24 and 40 in accordance with the desired operating cycle and frequency of the circuit 10 as desired.

In the drive circuit 60 of FIG. 3, 62 is an auxiliary direct current power supply. The auxiliary power supply 62 is not critical and may be in the range of eight to twenty volts direct current. The negative side of the auxiliary power supply 62 may be connected to the negative side of the power supply 10 if desired and may, therefore, be, for example, zero volts.

A free-runnig multivibrator 64 is connected to the opposite sides of the auxiliary power supply 62 and delivers substantially rectangular or square wave voltage output signals to the diode 66 and to the control electrode 46 of the silicon controlled rectifier 40 of the circuit 10. The signals out of the multivibrator 64 are of positive polarity with respect to the negative side of the auxiliary power source 62 and are out of phase with one another. When the voltage passed to the diode 66 is positive with respect to the negative side of the power source 62, the signal to the control electrode of the rectifier 40 is substantially zero volts and when the potential at the control electrode of the rectifier 40 is positive, the voltage at the diode 66 is substantially at zero volts.

It will be understood that on a positive signal from the multivibrator 64 appearing at the control electrode 46 of the silicon controlled rectifier 40 that the rectifier 40, as shown in both FIG. 3 and in the FIG. 1 for the purpose of connecting the circuit of FIG. 3 to the circuit 10 of FIG. 1, will be energized. Also, while the connection between the multivibrator 64 and the control electrode 46 of the silicon controlled rectifier 40 is indicated as being a direct in FIG. 3, the connection between the multivibrator output and the control electrode 46 may be through amplifying means or the like and still be considered direct.

In contrast, the positive output of the other side of the multivibrator 64 to the diode 66 is indirectly coupled to the control electrode 30 of the silicon controlled rectifier 24. A controllable decoupling system, including the diode 66, capacitor 72 and the Schmitt trigger circuit 74 is inserted between the output of the left side of the multivibrator 64 and the control electrode 30 of the silicon controlled rectifier 24, as illustrated in FIG. 3.

Since the operation of Schmitt trigger circuits is well understood, the circuit will not be described in great detail. It will be noted, however, that normally the input transistor 76 will be conducting due to current flow through the resistor 78, the emitter base junction of the transistor 76 and the resistance 80 connected in series across the auxiliary power supply 62. In the normal or quiescent state of the Schmitt trigger circuit 74, the transistor 82 will not be conducting and no control signal will be provided to the control electrode 30 of the silicon controlled rectifier 24.

In operation of the control circuit 60 a positive output pulse from the left side of the multivibrator 64, as shown in FIG. 3, is transmitted through conduction of the diode 66 to point 84 and then through condenser 72 to provide a transient voltage swing at the point 86. If the transient voltage swing at point 86 be of sufficient magnitude, the transistor 76 will become non-conductive and transistor 82 will become conductive to provide a signal at the control electrode 30 of the silicon controlled rectifier 24 to cause the rectifier 24 to conduct.

In this operation it will be noted that the positive output signal from the multivibrator 64 to the diode 66 will persist for some length of time determined by the parameters the multivibrator 64 which may be variable to vary the frequency of operation of circuit 10. The potential at the point 86, due to a positive pulse from the multivibrator 64, will not, however, remain indefinitely since current will flow through the resistor 80. Therefore, after a time principally related to the time constant of condenser 72 and resistor 80, the potential at point 86 will decrease to a level which will again permit current to flow through the base emitter junction of transistor 76 to render transistor 76 conductive again which will turn off the transistor 82. At this time the signal on the control electrode 30 of the silicon controlled rectifier 24 will disappear. However, rectifier 24 will continue conducting until the silicon controlled rectifier 40 is turned on, as previously indicated.

After a predetermined time, the signal from the left side of the multivibrator 64 will disappear. However, the disappearing of the signal from the left side of the multivibrator 64 will have no effect on the drive circuit 60 because of the blocking action of the diode 66. There then follows a time interval when multivibrator 64 provides a positive output signal from the right-hand side thereof, as shown in FIG. 3, to the control electrode 46 of the silicon controlled rectifier 40 and substantially no voltage output to the rectifier 66. It is during this time interval that the control circuit of FIG. 4 functions to reset or ready the drive circuit for the cycle which is to follow by reducing the potential at point 84 to thereby recharge the condenser 72.

If no control action takes place there is no change in potential at point 84, and consequently no change in the charge on condenser 72. In this case, when the following positive pulse appears at the left side of the multivibrator 64, the voltage at point 84 merely rises to the voltage which has been left at point 84 at the end of the last positive pulse from the multivibrator 64 to the diode 66, and there is no attendant transient voltage pulse at point 86. Accordingly, the Schmitt trigger circuit 74 does not change state and no signal is provided on the control electrode 30 of the silicon controlled rectifier 24 to cause the rectifier 24 to become conductive.

Figures 4, 5:
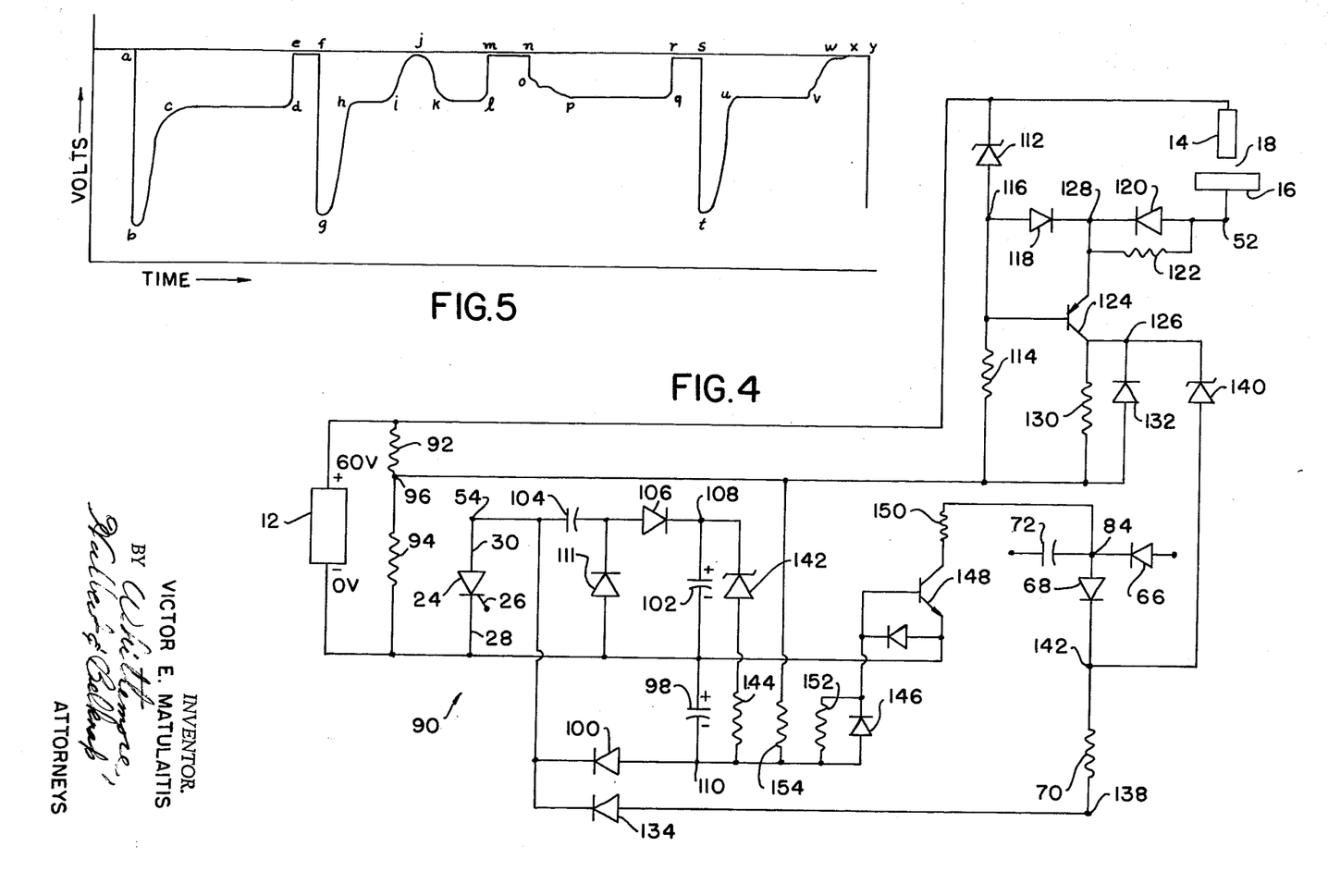
FIG. 4 is a schematic diagram of circuit means for controlling the electrical discharge machining circuit of FIG. 1 constructed in accordance with the invention.
FIG. 5 is a graphic representation of possible operating parameters of a plurality of possible machining cycles of an electrical discharge machining circuit, such as that illustrated in FIG. 1.

In other words, if the control circuit 90 illustrated in FIG. 4 does not drain the charge from point 84 during the period when there is no positive pusle from the multivibrator 64 passed to the diode 66, the voltage at point 86 will remain substantially fixed and the silicon controlled rectifier 24 will remain turned off even though the multivibrator 64 changes state. Thus, the interposition of the diode 66, diode 68, capacitor 72 and the Schmitt trigger 74 between the multivibrator 64 and the control electrode 30 of rectifier 24 provides a relatively simple means for decoupling or disconnecting the the continuous signals from multivibrator 64 at diode 66 from rectifier 24 as desired.

Before considering the control circuit 90, the voltage conditions in the spark gap 18 of the electrical discharge machining circuit 10 under different conditions will first be considered in conjunction with FIG. 5. In FIG. 5 the first machining cycle, as illustrated by voltages from $a$ to $f$, is a normal machining cycle. Thus the path $a$ to $b$ illustrates the initial growth of voltage across the machine gap 18 to the ionization point at point $b$. Once ionization occurs the voltage across the machining gap 18 drops rapidly along the path $b$ to $c$ in FIG. 5 to a value characteristic of the materials comprising the electrode 14 and workpiece 16. The gap voltage then remains substantially constant for the remaining portion of the machining cycle from $c$ to $d$. The arc or spark extinguishes abruptly with reduction in voltage, as indicated by the voltage excursion $d$ through $e$. Subsequently, the voltage across the gap remains quiescent for a time interval from $e$ to $f$ as previously considered.

The second machining cycle illustrated in FIG. 5 includes voltage variations across the machining gap 18 with a first type of voltage irregularity. As before, the voltage across the machining gap 18 increases along a path to $g$ and on ionization potential being reached falls rapidly along path $q$ to $h$ to the characteristic machining voltage of the gap 18. However, instead of maintaining this gap voltage to point $l$ an intermediate complete or partial short circuit occurs in the gap 18 at time $i$ so that the voltage across the machining gap is found to follow some path, such as $i$ to $j$. If the abnormality in the machine gap 18 is of very short duration the short circuit condition of the gap represented by point $j$ does not persist. Instead, the short circuit clears and the gap voltage rises along a path $j$ to $k$ to reestablish the normal machining gap conditions at point $k$. The normal gap voltage then persists to point $l$ where the arc or spark across the gap 18 is extinguished along path $l$ to $m$ in the normal manner and the machining gap 18 does not conduct current or is dormant during the time $m$ to $n$.

It has been found that for this type of fault in the machining gap, that is for an intermediate partial or complete short circuit attended by subsequent recovery within any one specific cycle of the operation of the electrical discharge machining circuit 10, that it is not desirable to interrupt the machining sequence even if the sequence could be conveniently interrupted. In other words, there is no purpose in cutting off the power from the machining gap 18 in response to a transient short circuit condition which is so tenuous and of such short duration that it clears itself within one machining cycle.

The third machining cycle *m* to *s* illustrated in FIG. 5 shows a voltage abnormality which occurs whenever the gap is partially or completely short circuited at the beginning of the cycle. In this case the voltage never initially rises to ionizing potential as at points *b* or *q*. Instead the voltage increases along some irregular path, such as *n, o, p* to a point where normal machining voltage becomes established. An abnormal machine cycle, such as shown at *m* to *s* could result from a small red-hot chip created by a preceding machining cycle lightly bridging the gap between the electrode 14 and workpiece 16 at the time a machining pulse has been initiated. Once the normal machining voltage is reached as at point *p* with this type of fault the normal machining cycle will continue to the point *s*. Again for this type of abnormal machining cycle there should be no interruption of the machining process.

In the last type of abnormal machining cycle illustrated in FIG. 5 from *s* to *y*, before the arc or spark between the electrode 14 and workpiece 16 is extinguished in the normal manner, a short circuit of the gap occurs as is illustrated by the voltage excursion *v, w, x*. With such a fault it has been found that gap current cut-off action should occur. That is to say only in the event that the gap voltage is found to be less than normal when the machining arc or spark is normally extinguished should there be gap current cut off.

Accordingly, the control circuit 90 should not depend upon average gap voltage to remove power from the machine gap due to abnormal machining voltage. Control systems designed to respond to changes in average gap voltage respond too slowly and do not provide the type of control required. Further, the control circuit of FIG. 4 is not to initiate current cutoff action in response to a lower than normal gap voltage if the lower voltage occurs during the course of a normal machining cycle and a recovery to a normal machine condition has occurred at the termination of the particular machine cycle.

It is therefore desired to monitor the machining gap voltage on a per pulse basis, that is, each time a positive signal is provided from the left hand side of the multivibrator 64 and the control circuit of FIG. 4 is to be responsive to the instantaneous voltage at the machining gap in the time interval immediately proceeding the normal gap voltage cut off. Thus, in accordance with the above discussion in the event the machining gap voltage at the termination of the pulse of positive energy from the multivibrator 64 is less than a preselected minimum current, cut off is to be initiated by the control circuit of FIG. 4.

Further, in accordance with the control circuit of FIG. 4, on sensing of a preselected minimum voltage in the machining gap at cut off, the silicon controlled rectifier 24 is to be maintained cut off for a preselected number of pulses from the multivibrator 64 immediately following the pulse during which an undesirable machining gap condition is sensed. After the preselected number of pulses have been skipped, one trial pulse is permitted to turn the rectifier 24 on and the voltage at the gap is again monitored. If the voltage at the gap is found to be normal at this time, uninterrupted machining due to cycling of the electrical discharge machining circuit 10 by the drive circuit of FIG. 3 is restored. If the voltage at the machining gap is found to be lower than the predetermined minimum at the time of the trial pulse, the control circuit of FIG. 4 will function to delete a second preselected or predetermined number of pulses preferably greater than the initial deletion.

The trial procedure is repeated with progressive increase in the length of time between successive trial pulses until either normal cutting is reestablished in the machining gap or until the time interval between trial pulses reaches a preselected maximum. For example, initially one to four pulses may be omitted after the first trial pulse, five to ten pulses may be omitted after the second trial pulse, and the time between time pulses may be ultimately increased until the trial pulses are permitted at a rate somewhere between five to twenty repetitions per second. Thus, if normal machining is conducted at the rate of one thousand cycles per second of the electrical discharge machining circuit 10 and the lowest trial pulse rate be selected at ten per second, the control circuit will function to omit some ninety-nine pulses between consecutive trial or test pulses.

It has been found that with the control circuit of FIG. 4 functioning to control the drive circuit 60 and therefore the machining circuit 10 in the manner described, the fault of direct current arcing in the electrical discharge machining circuit 10 is virtually eliminated. The control circuit of FIG. 4 is therefore particularly advantageous in that direct current arcing often occurs and is usually associated with poor machining gap conditions, such as poor or inadequate dielectric flushing. The poor gap conditions do not infer negligence or lack of knowledgeability on the part of an electrical discharge machine operator but are often due to the peculiarity or nature of the machining operation required and cannot be avoided.

Referring then particularly to the control circuit 90 of FIG. 4, the resistors 92 and 94 are connected directly across the power supply 12 and act as a voltage divider, such that if the power supply 12 has a sixty volt positive output, the potential between the resistors 92 and 94 at point 96 will be approximately 20 volts which will be subsequently referred to.

Two other voltages are also established in circuit 90 by the periodic voltage fluctuations at rectifier 24, also illustrated in FIG. 4 along with diodes 66 and 68, capacitor 72 and resistor 70. Thus, during the time that point 54 is negative with respect to the negative or zero voltage side of the power supply 12, that is between times $t_1$ to $t_2$ illustrated in FIG. 2—B, condenser 98 is charged through diode 100 to a negative potential of between forty and sixty volts at point 110. In addition, when the point 54 is positive with respect to the negative side of the power supply 12, the condenser 102 is step charged through the capacitor 104 and diode 106 to some forty to sixty volts positive at point 108.

More specifically with increased positive potential at point 54, current flows through the capacitor 104, diode 106 and capacitor 102 to the negative side of the power supply 12. During this charging capacitors 104 and 102 act as a capacitor voltage divider. As the voltage at point 54 falls, the charge on capacitor 104 is redistributed by current flow through the diode 111. Therefore, if the capacity of capacitor 104 is small, that is for example one-tenth of a microfarad, compared with the capacity of capacitor 102, that is from two to ten microfarads, a number of cyclic voltage variations at point 54 will be required to step charge capacitor 102 to its maximum voltage.

Also, it will be noted that the capacitor 102 is relatively large compared to the capacity of capacitor 98 which may be, for example from three-tenths to five-tenths microfarads. The charging of capacitors 98 and 102 and discharging thereof provide the progressively larger time delays between successive trial pulses passing through the drive circuit 60 to the machining circuit 10 as will be seen subsequently.

The Zener diode 113 and resistor 114, as shown, are connected in series with each other across the resistor 92. Thus, the voltage at point 116 remains at some fixed value lower than the initial positive voltage of the power supply 12, such as for example forty volts positive if the Zener diode 113 has a voltage rating of, for example, twenty volts.

Thus, as long as the instantaneous voltage across the machining gap 18 is greater than twenty volts, as for example 24 to 26 volts, indicating normal machining at the machining gap 18, there will be a tendency for current flow to occur between point 116 and point 52 because the voltage at point 52 will be some four volts lower than the voltage at point 116.

In response to this small voltage difference between the points 116 and 52, current will flow through diode 118 but will be blocked from flowing through diode 120. However, resistor 122 provides a suitable shunt path around the diode 120 for current flow to point 52. This current flow is limited due to a relatively high resistance, as for example between one thousand and ten thousand ohms of the resistor 122. The voltage drop which occurs across diode 118 as a consequence of current flow from point 116 to point 52 will bias transistor 124 into a non-conducting state.

When the voltage across the machining gap 18 is less than twenty volts, as for example during the occurrence of a short between the electrode 14 and workpiece 16 as at point j, o, w and x in FIG. 5, there will be a current flow from point 52 to point 96 through the diode 120, the emitter base circuit of the transistor 124 and resistor 114. During these times diode 118 blocks the flow of current directly from point 52 to point 116 while diode 120 provides a low resistance path around the resistor 122.

Thus, the voltage at point 126 is constrained to fall within the voltage range of between forty and sixty volts. That is to say, whenever the voltage in the machining gap 18 is greater than the twenty volts of the Zener diode 113 diode 118 clamps point 128 to point 116 which is maintained at 40 volts with the 60 volts power supply 12 and the 20 volt Zener diode 112. Whenever the instantaneous voltage at the machining gap 18 is less than 20 volts, diode 120 clamps point 126 substantially to the voltage at the point 52 since for the purposes of the specification, the voltage drop across diodes, such as 120, and conducting transistors is considered to be negligible.

Therefore, since transistor 124 is biased into a non-conducting state, when the voltage at the machining gap 18 is greater than twenty volts and is biased into a conducting state when the voltage at the machining gap is less than twenty volts, it follows that the voltage at point 126 will make an abrupt twenty volt change as the instantaneous voltage across the machining gap 18 changes from slightly greater to slightly less than the voltage rating of the Zener diode 113 or changes in reverse. In this regard, it will be noted that if the transistor 124 is non-conducting, there will be no tendency for the voltage at point 126 to rise above that of the point 96 which is twenty volts in the example chosen. Furthermore, the voltage at point 126 cannot drop below the voltage at point 96, even in view of the resistor 130 due to the clamping action of diode 132. With the transistor 124 conducting through diode 120, point 126 will be clamped at substantially the voltage of point 52.

The abrupt voltage change at point 126 will occur at least once during every cycle of the electrical discharge machining circuit 10 for both normal and malfunctioning cycles. Whether the voltage change provides control action for the electrical discharge machining circuit 10 through the drive circuit 60 or not will depend on the time during the cycle at which the voltage change occurs.

In this regard, in the operation of the drive circuit 60, it will be remembered that when an initial positive pulse from the left side of the multivibrator 64 through diode 66 and condenser 72 provided a transient signal through resistor 80 at point 86 to cause the Schmitt trigger circuit 74 to change state and provide a control pulse to the control electrode of the silicon controlled rectifier 24 to turn the rectifier 24 on and initiate a machining cycle, the initial pulse from the multivibrator 64 also left a charge at point 84 substantially equal to the positive output pulse of the left side of multivibrator 64. Now referring again to the control circuit of FIG. 4, when the silicon controlled rectifier 24 is non-conducting during the excursion $f$, $g$, $h$ in FIG. 2—B, the negative voltage at the point 54 is transferred through the diode 134 to the point 138.

In a normal machining sequence, the momentary existence of this negative voltage which may be from forty to sixty volts negative is sufficient to permit current flow through the diode 68 and resistor 70 to the negative potential at point 138 in sufficient magnitude and for sufficient time to permit such redistribution of the charge in capacitor 72 that the voltage at point 84 drops to substantially zero volts. It should be noted that the voltage at point 84 cannot become negative with respect to the negative side of the power supply 12 because of the clamping action of the diode 66. This normal recharging of condenser 72 readies or prepares the circuit to transmit the following positive pulse from the left hand side of the multivibrator 64 as an effective control signal at the control electrode 26 of the silicon controlled rectifier 24.

It should further be noted that this readying action accomplished by the control circuit 90 of FIG. 4 takes place during a time interval, such as $t_1$ to $t_2$ in FIG. 2 which is some time prior to the actual firing of rectifier 24 which occurs at time $t_4$. Obviously this preparatory action can only take place if the voltages at points 84 and 138 are allowed to fall adequately.

For the above indicated preparatory action to take place the voltage of the machining gap 18 must be greater than the voltage rating of the Zener diode 112. The transistor 124 must not be conducting so that the voltage at point 126 cannot be greater than plus twenty volts. Therefore, if the rating of the Zener diode 140 is twenty volts a negative voltage signal of sixty volts magnitude at point 138 will permit the voltage at point 142 to fall to zero volts. With the voltage at point 142 at zero volts, the voltage at point 84 will also fall to zero volts due to the clamping action of diode 68.

If, however, the voltage across the machining gap 18 during the time interval $t_1$ to $t_2$ is less than the voltage of Zener diode 112 and assuming the instantaneous gap voltage during time $t_1$ to $t_2$ is fifteen volts, the transistor 124 will be conducting in its saturated mode so that the voltage of point 126 will be clamped at point 52 and will be approximately forty-five volts. Then with the Zener diode 140 rated at twenty volts, the voltage at point 142 cannot be less than Twenty-five volts positive. This will be true even though point 138 momentarily goes to a negative sixty volt potential. There can therefore be no lowering of the voltage at point 84 since the voltage at point 142 cannot be less than 25 volts. The drive circuit 60 is thus effectively shut down.

The electrical discharge machining circuit 10 will remain shut down under this condition indefinitely unless the voltage at point 84 is reduced sufficiently so that the repetitive positive signal pulses from the multi-vibrator 64 through diode 66 can transfer through condenser 72 and cause rectifier 24 to become conductive.

To lower the voltage at point 84 and create the above indicated sequence of trial pulses through the drive circuit of FIG. 3, the previously indicated negative charge on capacitor 98 and the positive charge on capacitor 102 will be made use of. With the cessation of pulsating voltage at point 54, the voltages at points 108 and 110 decay. Since initially the voltage at point 108 is substantial, a relatively heavy current will flow from point 108 to point 110 through the Zener diode 142 and resistor 144. This relatively heavy current will cause the potential of point 110 to rise from its initial negative value toward the zero volts of the negative side of the power supply 12 relatively rapidly.

Immediately on the point 110 becoming positive with respect to the zero potential of the negative side of the power supply 12, current will flow from point 110 through the diode 146 and the emitter base circuit of the transistor 148. This current flow renders transistor 148 conductive and permits current flow from the point 84 through resistor 150 and the transistor 148 to the negative side of the power supply 12. The point 84 in the drive circuit 60 is thus unblocked for one trial pulse.

subsequently, commutating rectifier 24 to its non-conducting state at the end of the single pulse from the free running multivibrator 64 recharges condenser 98 to sixty volts whereupon there is a second delay while the voltage at point 110 again rises to a value slightly positive with regard to the voltage at the negative side of the power supply 12 providing at the end of the trial pulse the voltage in the machining gap 18 is still below that of the Zener diode 112 so that the point 84 is prevented from discharging through the diode 68 as under normal machining conditions.

Each of the trial pulses provided by the control circuit 90 recharges condenser 98 to a level of substantially sixty volts. Similarly, each corresponding positive voltage change at point 108 will tend to replenish the positive charge on condenser 102. However, the voltage at point 108 will fall progressively because the charging action is limited by the relative capacity values of the condensers 104 and 102. Thus, a number of successive positive pulses at point 54 are required to fully charge condenser 102.

Because the occasional recharging action of condenser 104 only partially recharges the condenser 102 while the load tends to discharge condenser 102 continuously, the voltage at point 108 keeps dropping. As the positive voltage at the point 108 decreases the current through the Zener diode 142 and resistor 144 will also decrease and consequently a progressively longer time interval will be required to discharge condenser 98. With a proper choice of parameters, a point is finally reached where the current flow from point 108 to 110 becomes substantially zero.

At this time it will be noted that there exists a second circuit path for causing the negative voltage at point 110 to rise to that of the negative side of the power supply 12, that is through resistor 154. This then establishes the ultimate spacing of the trial pulses.

In the case of a prolonged gap short circuit condition, the repetition rate of the trial pulses may be adjustable to any desired ultimate rate by the proper selection of voltage at point 96 and the time constant of the combination of resistor 154 and capacitor 98.

What is claimed is:

1. A circuit for electroerosion machining comprising a silicon controlled rectifier having anode, cathode and control electrodes, a source of electrical power and an electrode and workpiece in spaced apart relation to provide a machining gap connected in series with the anode and cathode of the rectifier and means connected to the control electrode of the rectifier for positively and rapidly turning the rectifier on and off including a free-running multi-vibrator and means indirectly connecting one side of the multi-vibrator to the control electrode of the rectifier including a Schmitt trigger circuit connected to the rectifier and means for providing a transient signal to actuate the Schmitt trigger circuit in response to a signal pulse from the one side of the multi-vibrator and means for inhibiting the transient signal provided to the Schmitt trigger circuit in response to a pulse from the one side of the multi-vibrator at controlled times.

2. A circuit as set forth in claim 1, wherein the means for inhibiting the transient signal includes a capacitor and first diode in series between the one side of the multivibrator and the Schmitt trigger circuit, and a second diode connected between the capacitor and first diode.

3. The method of electroerosion machining comprising connecting a power supply, electrode, machining gap, workpiece and silicon controlled rectifier in series, rapidly turning the silicon controlled rectifier on and off, monitoring the machining gap during each machining cycle, preventing conducting of the rectifier in response to recognition of minimum voltage across the machining gap at the end of a machining cycle, testing the voltage across the machining gap at predetermined intervals after sensing a minimum voltage across the machining gap at the end of a machining cycle to determine if the minimum voltage has increased to a machining voltage and automatically varying the length of time between testing of the voltage across the machining gap in accordance with the length of time a minimum voltage has been present across the machining gap.

4. The method as set forth in claim 3 and further including ultimately maintaining a predetermined maximum testing interval after varying the testing interval up to the predetermined maximum.

5. A circuit for electroerosion machining comprising a silicon controlled rectifier having anode, cathode and control electrodes, a source of electrical power and an electrode and workpiece in spaced apart relation to provide a machining gap connected in series with the anode and cathode of the rectifier and means connected to the control electrode of the rectifier for positively and rapidly turning the rectifier on and off including a free-running multi-vibrator and means indirectly connecting one side of the multi-vibrator to the control electrode of the rectifier including a trigger circuit connected to the rectifier and means for providing a transient signal to actuate the trigger circuit in response to a signal pulse from the one side of the multi-vibrator and means for inhibiting the transient signal provided to the trigger circuit in response to a pulse from the one side of the multi-vibrator at controlled times.

\* \* \* \* \*